United States Patent
Figeys (10) Patent No.: US 12,044,882 B2
(45) Date of Patent: Jul. 23, 2024

(54) MULTILAYER INTEGRATED PHOTONIC STRUCTURE

(71) Applicant: IMEC VZW, Leuven (BE)

(72) Inventor: Bruno Figeys, Herent (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 18/068,066

(22) Filed: Dec. 19, 2022

(65) Prior Publication Data

US 2023/0194777 A1 Jun. 22, 2023

(30) Foreign Application Priority Data

Dec. 20, 2021 (EP) .................................. 21216144

(51) Int. Cl.
*G02B 6/12* (2006.01)
*G02B 6/36* (2006.01)

(52) U.S. Cl.
CPC ....... *G02B 6/12002* (2013.01); *G02B 6/3608* (2013.01); *G02B 2006/12104* (2013.01)

(58) Field of Classification Search
None
See application file for complete search history.

(56) References Cited

U.S. PATENT DOCUMENTS 6,845,184 B1 * 1/2005 Yoshimura ............... H01L 23/48
385/9
2005/0156801 A1 7/2005 Honda 2007/0212008 A1 9/2007 Schoebel
2010/0060521 A1 3/2010 Hayes et al.
2012/0092224 A1 4/2012 Sauleau et al.
2014/0354499 A1 12/2014 Legay et al.
(Continued)

FOREIGN PATENT DOCUMENTS

WO 2021086789 A1 5/2021

OTHER PUBLICATIONS

Extended European Search Report and Written Opinion, Application No. EP 21216144.2, mailed Jun. 17, 2022, 11 pages.
(Continued)

*Primary Examiner* — Jerry Rahll
(74) *Attorney, Agent, or Firm* — Knobbe, Martens, Olson & Bear LLP (57) ABSTRACT

Example embodiments relate to multilayer integrated photonic structures. An example multilayer integrated photonic structure includes a propagation region formed in a first photonic layer. The propagation region includes a plurality of waveguides and a slab region in which the plurality of waveguides terminates. The multilayer integrated photonic structure also includes an outcoupling structure formed in a second photonic layer on top of the first photonic layer. The outcoupling structure is configured to couple light into and out of the multilayer integrated photonic structure. Additionally, the multilayer integrated photonic structure includes a reflector configured to optically couple the slab region of the first photonic layer and the second photonic layer. The reflector includes a first reflector element included in the slab region of the first photonic layer and a second reflector element included in the second photonic layer. The first and second reflector element are in optical communication with each other.

22 Claims, 6 Drawing Sheets

(56) References Cited

U.S. PATENT DOCUMENTS

2016/0245895 A1* 8/2016 Lane ............... G02B 6/3544
2021/0124023 A1* 4/2021 Dunphy ............ G01S 7/4818

OTHER PUBLICATIONS

Ettorre, Mauro, Ronan Sauleau, and Laurent Le Coq. "Multi-beam multi-layer leaky-wave SIW pillbox antenna for millimeter-wave applications." IEEE Transactions on Antennas and Propagation 59, No. 4 (2011): 1093-1100.

Tudosie, George, and Ruediger Vahldieck. "An LTCC-based folded Rotman lens for phased array applications." In 2006 Asia-Pacific Microwave Conference, pp. 2106-2109. IEEE, 2006.

Lee, Woosung, Jaeheung Kim, and Young Joong Yoon. "Compact two-layer Rotman lens-fed microstrip antenna array at 24 GHz." IEEE Transactions on Antennas and Propagation 59, No. 2 (2010): 460-466.

Tekkouk, Karim, Mauro Ettorre, Laurent Le Coq, and Ronan Sauleau. "Multibeam SIW slotted waveguide antenna system fed by a compact dual-layer Rotman lens." IEEE Transactions on Antennas and Propagation 64, No. 2 (2015): 504-514.

Tekkouk, Karim, Mauro Ettorre, Ronan Sauleau, and Massimiliano Casaletti. "Folded Rotman lens multibeam antenna in SIW technology at 24 GHz." In 2012 6th European Conference on Antennas and Propagation (EUCAP), pp. 2308-2310. IEEE, 2012.

Lian, Ji-Wei, Yong-Ling Ban, Zhi Chen, Bin Fu, and Chunhua Xiao. "SIW folded Cassegrain lens for millimeter-wave multibeam application." IEEE antennas and wireless propagation letters 17, No. 4 (2018): 583-586.

* cited by examiner

MULTILAYER INTEGRATED PHOTONIC STRUCTURE

CROSS-REFERENCE TO RELATED APPLICATIONS

The present application is a non-provisional patent application claiming priority to European Patent Application No. EP 21216144.2, filed Dec. 20, 2021, the contents of which are hereby incorporated by reference.

FIELD OF THE DISCLOSURE

The present disclosure generally relates, amongst others, to multilayer integrated photonic structures and to methods related thereto. More particularly, it relates to multilayer integrated photonic structures for optical beamforming and to methods of manufacturing thereof.

BACKGROUND

Mass-scale microfabricated optical waveguides are being considered for various applications such as, for example, spectroscopy, sensing, telecommunications, and optical beamforming. Most of these applications typically rely on the manufacturing of, for example, optical phased arrays, planar lenses, multiplexers and/or demultiplexers, in the form of for example arrayed waveguide gratings, echelle gratings, cascaded Mach-Zehnder interferometers, ring resonators, etc. Depending on the specific application, these optical integrated circuits can become rather large.

Optical beamforming technology concerns the ability to steer, shape and focus light. It is a powerful tool to directly manipulate a light signal, e.g., for LiDAR, optical communication. LiDAR, standing for light detection and ranging or laser imaging, detection and ranging, is indeed a method for determining ranges by targeting an object with a laser and measuring the time for the reflected light to return to the receiver. Optical beamforming technology is also a powerful tool to indirectly change a radio frequency on an optical carrier, e.g., for 5G, radar. Optical beamforming may be used, for example, for 5G networks which include large, flexible bandwidths and directional communication, which can be provided by integrated microwave photonics. Optical beamforming can also be relevant for free-space optical communication systems which demand high-capacity and secure communication links, both via satellites and remote ground links. Advanced medical applications, such as optical coherence tomography (OCT) scanners, may use imaging technologies that enable accurate diagnostics and monitoring, and optical beamforming can play a significant role for these applications.

To reduce the chip cost, it is important that the substrate cost on which the integrated photonic structures are manufactured does not dominate the price. This could happen when the substrate is very expensive per surface area, more particularly when the substrate already involves a significant amount of process steps, e.g., a complementary metal-oxide-semiconductor (CMOS) wafer, or a III-V wafer fabricated from a particular material and/or with a particular mask. For optical beamforming applications, the photonic integrated structures tend to become very large, in fact much larger than the CMOS area used for driving the beamformer. Either a very expensive substrate is used to fabricate the integrated photonic structures, or the CMOS wafer and the photonic circuit wafer are processed separately to minimize the processing costs. An extra cost is however necessary later on to combine the two chips together.

When working with such large integrated photonic structures, it is possible that the photonic circuit becomes larger than the reticle size of a lithographic mask. In particular, in optical beamforming, the large, required aperture leads to very large photonic circuits. Such circuits cannot be manufactured with standard technology. One may rely on the stitching of several reticles together according to a procedure that is not standard in CMOS processing.

For lens-based beamforming applications the design of such beamforming circuit typically includes very heterogeneous areas, e.g., areas with large amount of material to be etched versus areas with low amount of material to be etched, or large areas with different material thicknesses. Such conditions are typically very difficult to realize side by side in microfabrication with strict tolerances.

SUMMARY

Example embodiments propose a multilayer integrated photonic structure for optical beamforming which do not show the inherent shortcomings of conventional examples. More specifically, example embodiments propose a multilayer integrated photonic structure which demonstrates a reduced footprint while allowing a decoupling of the manufacturing of heterogeneous areas.

The scope of protection sought for various embodiments is set out by the independent claims.

The embodiments and features described in this specification that do not fall within the scope of the independent claims, if any, are to be interpreted as examples useful for understanding various embodiments.

There is a need for a multilayer integrated photonic structure for optical beamforming (e.g., which fits in one lithographic reticle), thereby demonstrating a reduced footprint and reducing the processing costs.

Amongst others, example embodiments improve the processing compatibility and the integration of photonic structures for optical beamforming with other CMOS compatible technologies.

This is achieved, according to a first example aspect of the present disclosure, by a multilayer integrated photonic structure for optical beamforming, wherein the multilayer integrated photonic structure comprises:

- a propagation region formed in a first photonic layer, wherein the propagation region comprises a plurality of waveguides and a slab region in which the plurality of waveguides terminates;
- an outcoupling structure formed in a second photonic layer on top of the first photonic layer, wherein the outcoupling structure is configured to couple light into and out of the multilayer integrated photonic structure;
- a reflector configured to optically couple the slab region of the first photonic layer and the second photonic layer; wherein the reflector comprises:
    - a first reflector element comprised in the slab region of the first photonic layer; and
    - a second reflector element comprised in the second photonic layer;
    - and wherein the first reflector element and the second reflector element are in optical communication with each other.

The multilayer integrated photonic structure according to the present disclosure is physically distributed over several photonic layers, such as, for example, two, three, four, five, etc., tens of photonic layers. This way, more compact designs of photonic structures and/or lens-based structures can be achieved. The footprint of the multilayer integrated photonic structure according to the present disclosure is distributed over at least a first photonic layer and a second photonic layer which are optically coupled to each other. In other words, instead of forming the entire integrated photonic structure on a plane of a substrate, the design of the integrated photonic structure is distributed over several photonics layers, as if the design of the integrated photonic structure has been folded and stacked along the direction 8 shown on FIG. 1 of the present disclosure. This reduces the surface area of substrate onto which the multilayer integrated photonic structure is formed, thereby reducing the associated manufacturing and processing costs. This surface area can be minimized with respect to the surface area which would be used to manufacture the whole multilayer integrated photonic structure in the plane of the substrate. The total footprint of the multilayer integrated photonic structure according to the present disclosure, for example, fits within one lithographic reticle. Additionally, when designing the integrated photonic structures, it becomes possible to decouple different regions to different photonic layers when strict tolerances are to be achieved. The processing of the multilayer integrated photonic structure is thereby made less complex. It further improves the compatibility of photonic layers with other CMOS compatible technologies by facilitating their integration on the same chip. Lithographic, processing, etching requirements with different densities in the same processing layer are hereby alleviated.

In the context of the present disclosure, the multilayer integrated photonic structure further comprises a substrate onto which the photonic layers are formed. A photonic layer according to the present disclosure is understood as a layer extending substantially parallel to the plane of the substrate onto which the photonic layers are formed. A photonic layer comprises, for example, optical waveguides or photonic waveguides, and/or one or more reflectors, and/or an outcoupling structure to couple light in and out of the multilayer integrated photonic structure according to the present disclosure.

In the context of the present disclosure, light corresponds to an optical beam, which is an electromagnetic wave that remains essentially concentrated around a mean axis upon free propagation or that is guided by one or more suitable structures such as the photonic layers of the multilayer integrated photonic structure according to the present disclosure. An optical beam is, for example, a laser beam. Alternatively, an optical beam is a light beam emitted by a light source, such as, for example, a light emitting diode. An optical beam is, for example, coupled into the propagation region of one or more of the photonic layers, then propagates along one or more photonic layers, then is coupled from one or more of the photonic layers to another photonic layers and is finally transmitted out of the last photonic layer by an outcoupling structure. Alternatively, an optical beam is, for example, received by the outcoupling structure, then couples from the outcoupling structure into one or more photonic layers and finally propagates towards the propagation region. Alternatively, the multilayer integrated photonic structure according to the present disclosure is configured for simultaneous coupling and propagation of one or more optical beams out of and into the plane of the substrate.

Figure 1:
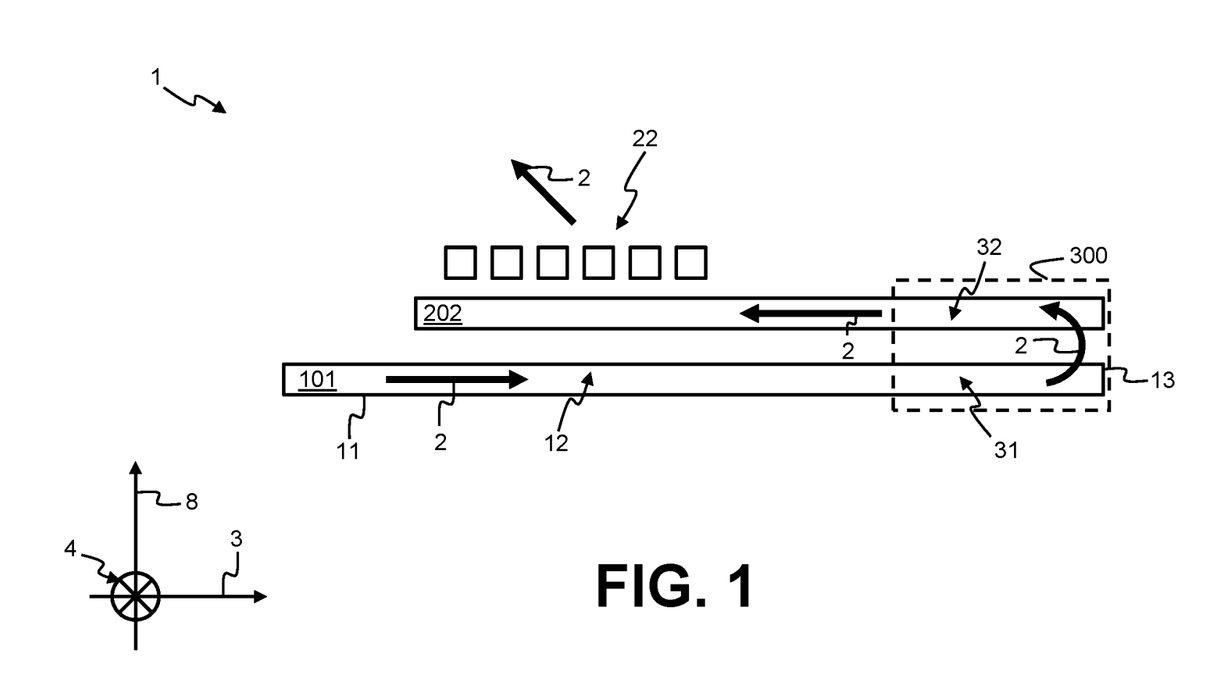
FIG. 1 depicts a cross-section view of a multilayer integrated photonic structure, wherein the multilayer integrated photonic structure includes two photonic layers, according to example embodiments.

In the context of the present disclosure, waveguides are optical waveguides, in the context of the present disclosure, a slab region, for example, comprises a slab waveguide. Practical rectangular-geometry optical waveguides are most easily understood as variants of a theoretical slab waveguide, also referred to as a planar waveguide. A slab waveguide is formed out of three layers of materials with different dielectric constants, extending in the directions parallel to their interfaces. An optical beam such as light may be confined in the middle layer by total internal reflection. This occurs as the dielectric index of the middle layer is larger than that of the surrounding layers. A slab waveguide is not infinite in the directions 3 and 4 shown on FIG. 1 of the present disclosure. Referring to FIG. 1 of the present disclosure, a typical size of the slab waveguide along the direction 3 and along the direction 4 is much larger than the depth of the slab waveguide along the direction 8 traverse to the plane of the substrate. Guided modes of a slab waveguide cannot be excited by an optical beam incident from the top or bottom interfaces of the slab waveguide. The reflector acts as a coupling element and may be used to couple light out of and/or into the slab waveguide. The slab waveguide according to the present disclosure confines the optical beams only in one direction, i.e., the direction 8 traverse to the plane of the substrate and of the photonic layers.

In the context of the present disclosure, a waveguide is an optical waveguide which is a physical structure, and which is adapted to guide electromagnetic waves in the optical spectrum. An optical waveguide is used as a component in integrated optical circuits or as the transmission medium in local and long-haul optical communication systems. In the context of the present disclosure, a plane of the substrate and of the photonic layers extends in the directions substantially parallel to the interface between the substrate and the first photonic layer formed on top of the substrate. An optical waveguide in the context of the present disclosure can be classified according to its geometry, for example, planar, strip, or fiber waveguide, its mode structure, for example, single-mode, multi-mode, its refractive index distribution, for example, step or gradient index, and/or its material, for example, glass, polymer, semiconductor such as, for example, silicon, silicon nitride, sapphire, silicon carbide, germanium, III-V materials, etc. A strip waveguide is basically a strip of the optical layer confined between cladding layers. The most straightforward case is a rectangular waveguide, which is formed when the guiding layer of a slab waveguide is restricted in both transverse directions rather than just one. A rib waveguide is a waveguide in which the guiding layer basically consists of a slab with one or more strips superimposed onto it. Rib waveguides also provide confinement of the wave in two dimensions and near-unity confinement is possible in multi-layer rib structures.

In the context of the present disclosure, an outcoupling structure allows an optical beam, for example, light, to be transmitted out of and/or to be received into the plane of the photonic layer which comprises the outcoupling structure. An outcoupling structure is, for example, an edge coupler, wherein the optical beam is transmitted to and/or is received from, for example, an optical fiber or another integrated optical structure. Alternatively, an outcoupling structure comprises one or more grating couplers. For example, an outcoupling structure is a grating coupler. Alternatively, an outcoupling structure is a reflector, such as, for example, a mirror.

In the context of the present disclosure, the substrate comprises one or more of the following: silicon, silicon-on-insulator, silicon carbide, sapphire, silicon nitride, germanium, germanium-on-insulator, III-V materials such as, for example, GaN and/or AlN, generic integrated photonic platforms, generic integrated electronic platforms, diamond, any flexible substrate such as, for example, any polymer, dielectrics, glass, etc.

In the context of the present disclosure, a photonic layer is formed on top of the substrate. One or more optical beams may propagate along a photonic layer and remain confined within this photonic layer except at the reflectors, where the one or more optical beams may be coupled from one photonic layer to another photonic layer.

In the context of the present disclosure, and when the multilayer integrated photonic structure comprises two photonic layers, the reflector is formed on the substrate and between the two photonic layers. This way, along the direction 8 as shown on FIG. 1 of the present disclosure, the multilayer integrated photonic structure first comprises a substrate, a first photonic layer formed on top of the substrate along the direction 8 shown on FIG. 1 of the present disclosure, the reflector comprising a first reflector element comprised in the slab region of the first photonic layer and further comprising a second reflector element comprised in a second photonic layer, and the second photonic layer formed on top of the first photonic layer along the direction 8 shown on FIG. 1 of the present disclosure. The first photonic layer and the second photonic layer are in optical communication with each other through the reflector. In other words, the reflector couples light in and/or out of one of the photonic layers to another photonic layer.

In the context of the present disclosure, a reflector is, for example, a mirror. Alternatively, a reflector is configured to ensure total internal reflection of the light, such as, for example, similar to a cat-eye design. Alternatively, a reflector may be a forward grating coupler or a backward grating coupler. For example, the first reflector element is a forward grating coupler and the second reflector element is a backward grating coupler, and both grating couplers are optimized for higher efficiency by matching their mode shapes. Alternatively, a reflector is a multi-mode interferometer. For example, a reflector is a vertical multi-mode interferometer with metal to ensure total internal reflection of light. Alternatively, a reflector is a vertical multi-mode interferometer with Bragg reflectors. The reflectors according to the present disclosure are optimized to improve the quality of the transmitted wave front in terms of bandwidth and efficiency.

The multilayer integrated photonic structure for optical beamforming according to the present disclosure is, for example, a Rotman lens. A typical Rotman lens comprises an input section comprising one or more input ports configured to allow light to be coupled to and/or from the Rotman lens. A Rotman lens further comprises a plurality of output ports optically coupling the propagating region and the slab region. A Rotman lens further comprises a power divider section and a splitter network. Instead of folding the transmission lines of the Rotman lens, the length that would be used for the transmission lines is first determined. A reflector is then placed on each substantially halfway of the transmission line. The second part of the waveguide is placed on top of the first half of the waveguide in a second photonic layer formed on top of the first photonic layer comprising the first half of the waveguide. A continuous version of the Rotman lens would consist of making an actual lens-like design, made from one or several different photonic layers. Several lenses would be used to correct for aberrations.

According to example embodiments, the first photonic layer and the second photonic layer are connected to each other at the reflector; and the reflector extends continuously at the junction between the first photonic layer and the second photonic layer.

This way, an optical beam such as, for example, light may couple from the first photonic layer to the second photonic layer and an optical beam such as, for example, light may couple from the second photonic layer to the first photonic layer.

According to example embodiments, the multilayer integrated photonic structure further comprises:
one or more intermediate photonic layers formed between the first photonic layer and the second photonic layer;
a first intermediate reflector element comprised in a first intermediate photonic layer and in optical communication with the first reflector element; and wherein the first intermediate reflector element is configured to optically couple the first intermediate photonic layer with the slab region of the first photonic layer;
a second intermediate reflector element comprised in a second intermediate photonic layer and in optical communication with the second reflector element; and wherein the second intermediate reflector element is configured to optically couple the second intermediate photonic layer with the second photonic layer; and
one or more intermediate reflectors configured to optically couple two of the intermediate photonic layers with each other.

According to example embodiments, the intermediate photonic layers comprise different slab effective indexes.

The intermediate photonic layers may, for example, comprise different materials. This way, achromatic lenses may be realized.

According to example embodiments, the intermediate photonic layers comprise different materials with different dispersion.

The intermediate photonic layers have different dispersion as the effective index changes in function of the wavelength of the light. This way, achromatic lenses wherein the intermediate photonic layers have different index changes in function of the wavelength of the light may be realized.

According to example embodiments, the intermediate photonic layers comprise sub-wavelength patterns with varying fill factor.

This way, sub-wavelength patterns defined in the waveguide medium of the intermediate photonic layers are used to achieve a target effective index, which can be uniform or position dependent to realize intermediate photonic layers with varying effective indexes. Sub-wavelength patterns in the waveguide medium may be used to achieve the target effective index n, which can be uniform or position dependent to realize a layer with varying effective index. For straightforward lenses the formula goes as follows:

$$\frac{\partial P}{\partial \lambda} = \frac{1}{n_c}\left(\frac{\partial n_1}{\partial \lambda} - \frac{n_1}{n_c}\frac{\partial n_c}{\partial \lambda}\right)k_1 + \frac{1}{n_c}\left(\frac{\partial n_2}{\partial \lambda} - \frac{n_2}{n_c}\frac{\partial n_c}{\partial \lambda}\right)k_2 \quad (1)$$

where $n_1$ and $n_2$ are the indices of the two lenses, $n_c$ is the index of the propagation region in between the lenses, $k_1$ and $k_2$ are based on the geometry, e.g. curvature of the lens and P is the power of the lens. For an achromatic lens design, the power should be wavelength independent, hence the right-hand side of equation (1) and therefore also the left-hand side of equation (1) should be equal or close to zero. Reflector/transition can be realized similar to the waveguide designs; however the previous taper transitions may be specifically designed for waveguide designs. They could be replaced by a gradual change in effective index, for example, using sub-wavelength features with varying fill factor, or by placing many waveguide transitions closely to one another to obtain a shark tooth profile, hence changing the average effective index gradually.

According to example embodiments:
the first photonic layer and the first intermediate photonic layer are connected by the first reflector element and the first intermediate reflector element; and
the second intermediate photonic layer and the second photonic layer are connected by the second reflector element and the second intermediate reflector element.

This way, light may propagate from the lower photonic layer along the direction 8 shown on FIG. 1 of the present disclosure to the first intermediate photonic layer formed above the first photonic layer along the direction 8. Also, light may propagate from the last intermediate photonic layer formed below the second photonic layer along the direction 8 shown on FIG. 1 of the present disclosure to the second intermediate photonic layer and vice versa.

According to example embodiments:
the first reflector element and the first intermediate reflector element extend continuously at the junction between the first photonic layer and the first intermediate photonic layer; and
the second reflector element and the second intermediate reflector element extend continuously at the junction between the second intermediate photonic layer and the second photonic layer.

According to example embodiments, each intermediate reflector comprises two intermediate reflector elements; wherein each intermediate photonic layer comprises two intermediate reflector elements:
one of the intermediate reflector element is formed in the intermediate photonic layer and is configured to optically couple the intermediate photonic layer with an intermediate photonic layer formed on top of the intermediate photonic layer along a direction extending from the first photonic layer to the second photonic layer;
the other intermediate reflector element is formed in the intermediate photonic layer and is configured to optically couple the intermediate photonic layer with an intermediate photonic layer formed below the intermediate photonic layer along the direction extending from the first photonic layer to the second photonic layer.

According to example embodiments, the intermediate photonic layers are connected to each other via two of the intermediate reflector elements.

This way, light may propagate between intermediate photonic layers. For example, the intermediate reflector elements extend continuously in the intermediate photonic layers.

According to example embodiments, the outcoupling structure is an optical fiber grating coupler.

According to example embodiments, the reflector and/or one or more of the intermediate reflectors are curved reflectors.

According to example embodiments, the propagation region comprises:
one or more input ports configured to allow light to be coupled to and/or from the multilayer integrated photonic structure;
a plurality of output ports configured to optically couple the propagation region and the slab region;
a power divider section; and
a splitter tree network.

According to a second example aspect of the present disclosure, there is provided a method for manufacturing a multilayer integrated photonic structure for optical beamforming, wherein the method comprises:
forming a propagation region in a first photonic layer, wherein the propagation region comprises a plurality of photonic waveguides and a slab region in which the plurality of waveguides terminates;
forming an outcoupling structure in a second photonic layer on top of the first photonic layer, wherein the outcoupling structure is configured to couple light into and out of the multilayer integrated photonic structure;
forming a reflector configured to optically couple the slab region of the first photonic layer and the second photonic layer; wherein the reflector comprises:
a first reflector element comprised in the slab region of the first photonic layer; and
a second reflector element comprised in the second photonic layer;
and wherein the first reflector element and the second reflector element are in optical communication with each other.

The method according to the present disclosure allows the manufacturing of a multilayer integrated photonic structure, wherein the multilayer integrated photonic structure is physically distributed over several photonic layers, such as, for example, two, three, four, five, etc., tens of photonic layers. This way, more compact designs of photonic structures and/or lens-based structures can be achieved. The footprint of the multilayer integrated photonic structure achieved from the method according to the present disclosure is distributed over at least a first photonic layer and a second photonic layer which are optically coupled to each other. In other words, instead of forming the entire integrated photonic structure on a plane of a substrate, the design of the integrated photonic structure is distributed over several photonics layers, as if the design of the integrated photonic structure has been folded and stacked along the direction 8 shown on FIG. 1 of the present disclosure. This reduces the surface area of substrate onto which the multilayer integrated photonic structure is formed, thereby reducing the associated manufacturing and processing costs. This surface area can be minimized with respect to the surface area which would be used to manufacture the whole multilayer integrated photonic structure in the plane of the substrate. The total footprint of the multilayer integrated photonic structure according to the present disclosure, for example, fits within one lithographic reticle. Additionally, when designing the integrated photonic structures, it becomes possible to decouple different regions to different photonic layers when strict tolerances are to be achieved. The processing of the multilayer integrated photonic structure is thereby made less complex. It further improves the compatibility of photonic layers with other CMOS compatible technologies by facilitating their integration on the same chip. Lithographic, processing, etching requirements with different densities in the same processing layer are hereby alleviated.

BRIEF DESCRIPTION OF THE DRAWINGS

Some example embodiments will now be described with reference to the accompanying drawings.

DETAILED DESCRIPTION

FIG. 1 schematically illustrates a cross-section view of an example embodiment of a multilayer integrated photonic structure 1 for optical beamforming according to the present disclosure. The multilayer integrated photonic structure 1 is, for example, manufactured on top of a substrate, not shown on the figures, but which extends along the longitudinal direction 3 shown on FIG. 1 and along the traverse direction 4 traverse to the longitudinal direction 3. A thickness of the substrate and of the layers extends along the depth direction 8 which is traverse to the longitudinal direction 3 and to the traverse direction 4. The multilayer integrated photonic structure 1 includes a first photonic layer 101 and a second photonic layer 202. The layers are arranged on top of each other along the depth direction 8. The first photonic layer 101 includes a propagation region 11. The propagation region 11 includes a plurality of waveguides 12 and a slab region 13 in which the plurality of waveguides 12 terminates, i.e., to which the plurality of waveguides 12 optically couple. The second photonic layer 202 includes an outcoupling structure 22. The outcoupling structure 22 couples light 2 into and out of the multilayer integrated photonic structure 1, for example, out of as depicted on FIG. 1. The multilayer integrated photonic structure 1 further includes a reflector 300 configured to optically couple the slab region 13 of the first photonic layer 101 and the second photonic layer 202. The reflector 300 includes a first reflector element 31 included in the slab region 13 of the first photonic layer 101. The reflector 300 includes a second reflector element 32 included in the second photonic layer 202. The first reflector element 31 and the second reflector element 32 are in optical communication with each other. The first photonic layer 101 and the second photonic layer 202 are connected to each other at the reflector 300. The reflector 300 extends continuously at the junction between the first photonic layer 101 and the second photonic layer 202. The outcoupling photonic structure 22 is, for example, an optical fiber grating coupler. The reflector 300 is, for example, a curved reflector.

Figure 2:
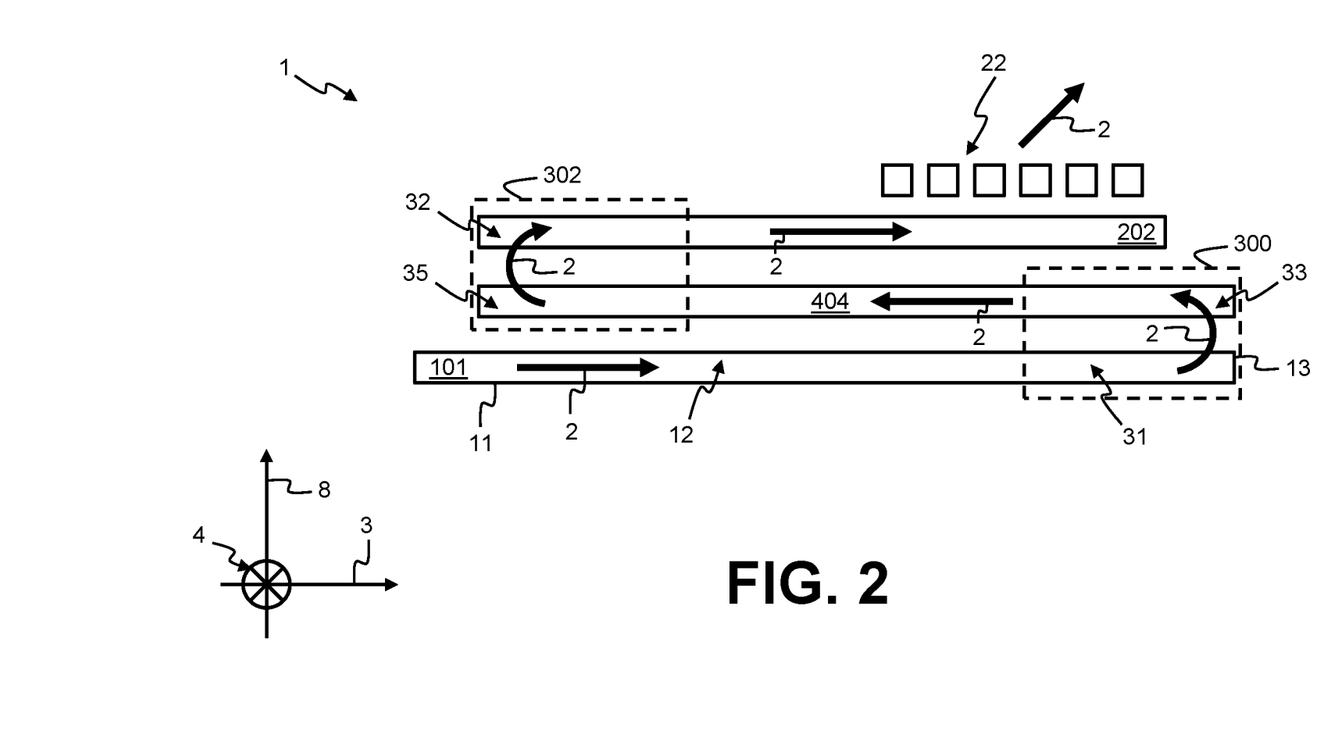
FIG. 2 depicts a cross-section view of a multilayer integrated photonic structure, wherein the multilayer integrated photonic structure includes three photonic layers, according to example embodiments.

FIG. 2 schematically illustrates a cross-section view of an example embodiment of a multilayer integrated photonic structure 1 for optical beamforming according to the present disclosure. The multilayer integrated photonic structure 1 is, for example, manufactured on top of a substrate, not shown on the figures, but which extends along the longitudinal direction 3 shown on FIG. 1 and along the traverse direction 4 traverse to the longitudinal direction 3. A thickness of the substrate and of the layers extends along the depth direction 8 which is traverse to the longitudinal direction 3 and to the traverse direction 4. Components having reference numbers identical to the reference numbers of components of FIG. 1 fulfill the same function. The multilayer integrated photonic structure 1 includes a first photonic layer 101, an intermediate photonic layer 404 and a second photonic layer 202. The layers are arranged on top of each other along the depth direction 8. The first photonic layer 101 includes a propagation region 11. The propagation region 11 includes a plurality of waveguides 12 and a slab region 13 in which the plurality of waveguides 12 terminates, i.e., to which the plurality of waveguides 12 optically couple. The second photonic layer 202 includes an outcoupling structure 22. The outcoupling structure 22 couples light 2 into and out of the multilayer integrated photonic structure 1, for example, out of as depicted on FIG. 2. The intermediate photonic layer 404 is formed between the first photonic layer 101 and the second photonic layer 202. The intermediate photonic layer 404 includes a first intermediate reflector element 33 in optical communication with the first reflector element 31 from the first photonic layer 101. Light 2 may couple from the first intermediate reflector element 33 to the first reflector element 31. Light may couple from the first reflector element 31 to the first intermediate reflector element 33. The first intermediate reflector element 33 optically couples the first intermediate photonic layer 404 with the slab region 13 of the first photonic layer 101. The intermediate photonic layer 404 includes a second intermediate reflector element 35 in optical communication with the second reflector element 32 from the second photonic layer 202. Light 2 may couple from the second intermediate reflector element 35 to the second reflector element 32. Light may couple from the second reflector element 32 to the second intermediate reflector element 35. The second intermediate reflector element 35 optically couples the first intermediate photonic layer 404 with the second photonic layer 202. The first photonic layer 101 and the first intermediate photonic layer 404 are connected by the first reflector element 31 and the first intermediate reflector element 33. The second photonic layer 202 and the first intermediate photonic layer 404 are connected by a reflector 302 including the second reflector element 32 and the second intermediate reflector element 35. The first reflector element 31 and the first intermediate reflector element 33 extend continuously at the junction between the first photonic layer 101 and the first intermediate photonic layer 404. The second reflector element 32 and the second intermediate reflector element 35 extend continuously at the junction between the second photonic layer 202 and the first intermediate photonic layer 404. The outcoupling photonic structure 22 is, for example, an optical fiber grating coupler. The reflector 300 and/or the reflector 302 are, for example, curved reflectors.

Figure 3:
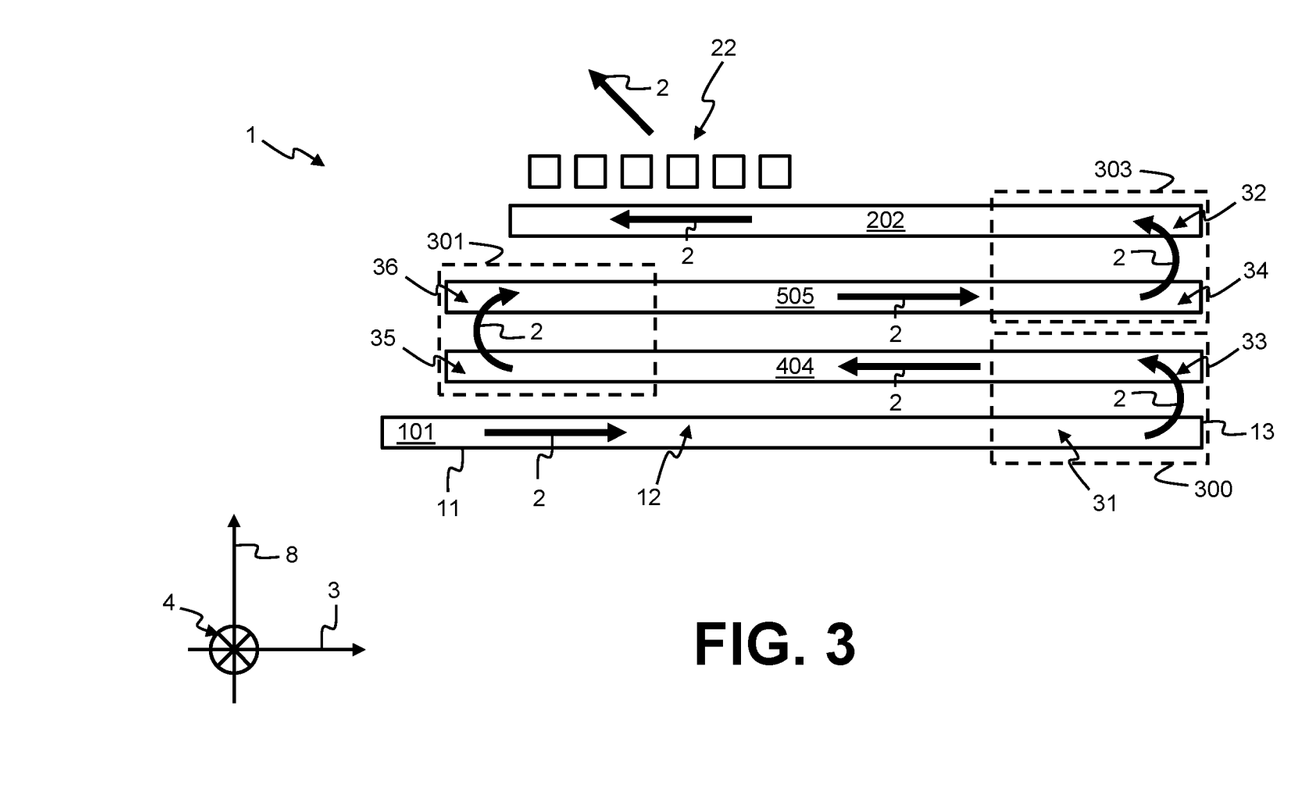
FIG. 3 depicts a cross-section view of a multilayer integrated photonic structure, wherein the multilayer integrated photonic structure includes four photonic layers, according to example embodiments.

FIG. 3 schematically illustrates a cross-section view of an example embodiment of a multilayer integrated photonic structure 1 for optical beamforming according to the present disclosure. The multilayer integrated photonic structure 1 is, for example, manufactured on top of a substrate, not shown on the figures, but which extends along the longitudinal direction 3 shown on FIG. 1 and along the traverse direction 4 traverse to the longitudinal direction 3. A thickness of the substrate and of the layers extends along the depth direction 8 which is traverse to the longitudinal direction 3 and to the traverse direction 4. Components having reference numbers identical to the reference numbers of components of FIG. 1 or FIG. 2 fulfill the same function. The multilayer integrated photonic structure 1 includes a first photonic layer 101, a first intermediate photonic layer 404, a second intermediate photonic layer 505 and a second photonic layer 202. The layers are arranged on top of each other along the depth direction 8. The first photonic layer 101 includes a propagation region 11. The propagation region 11 includes a plurality of waveguides 12 and a slab region 13 in which the plurality of waveguides 12 terminates, i.e., to which the plurality of waveguides 12 optically couple. The second photonic layer 202 includes an outcoupling structure 22. The outcoupling structure 22 couples light 2 into and out of the multilayer integrated photonic structure 1, for example, out of as depicted on FIG. 3. The intermediate photonic layer 404 is formed between the first photonic layer 101 and the second intermediate photonic layer 505. The intermediate photonic layer 404 includes a first intermediate reflector element 33 in optical communication with the first reflector element 31 from the first photonic layer 101. Light 2 may couple from the first intermediate reflector element 33 to the first reflector element 31. Light may couple from the first reflector element 31 to the first intermediate reflector element 33. The first intermediate reflector element 33 optically couples the first intermediate photonic layer 404 with the slab region 13 of the first photonic layer 101. The intermediate photonic layer 404 includes a second intermediate reflector element 35. The second intermediate photonic layer 505 includes a first intermediate reflector element 36 in optical communication with the second intermediate reflector element 35 from the first intermediate photonic layer 404. Light 2 may couple from the first intermediate reflector element 36 of the second intermediate photonic layer 505 to the second intermediate reflector element 35 of the intermediate photonic layer 404. Light may couple from the second intermediate reflector element 35 of the intermediate photonic layer 404 to the first intermediate reflector element 36 of the second intermediate photonic layer 505. The second intermediate photonic layer 505 further includes a second intermediate reflector element 34 in optical communication with the second reflector element 32 of the second photonic layer 202. Light 2 may couple from the second intermediate reflector element 34 of the second intermediate photonic layer 505 to the second reflector element 32 of the second photonic layer 202. Light may couple from the second reflector element 32 of the second photonic layer 202 to the second intermediate reflector element 34 of the second intermediate photonic layer 505. The first photonic layer 101 and the first intermediate photonic layer 404 are connected by the first reflector element 31 and the first intermediate reflector element 33. The first reflector element 31 and the first intermediate reflector element 33 extend continuously at the junction between the first photonic layer 101 and the first intermediate photonic layer 404. The first intermediate photonic layer 404 and the second intermediate photonic layer 505 are connected by an intermediate reflector 301 including the second intermediate reflector element 35 of the intermediate photonic layer 404 and the first intermediate reflector element 36 of the second intermediate photonic layer 505. The second intermediate reflector element 35 of the intermediate photonic layer 404 and the first intermediate reflector element 36 of the second intermediate photonic layer 505 extend continuously at the junction between the first intermediate photonic layer 404 and the second intermediate photonic layer 505. The second intermediate photonic layer 505 and the second photonic layer 202 are connected by a reflector 303 including the second intermediate reflector element 34 of the second intermediate photonic layer 505 and the second reflector element 32 of the second photonic layer 202. The second intermediate reflector element 34 of the second intermediate photonic layer 505 and the second reflector element 32 of the second photonic layer 202 extend continuously at the junction between the second intermediate photonic layer 505 and the second photonic layer 202. The outcoupling photonic structure 22 is, for example, an optical fiber grating coupler. The reflector 300 and/or the intermediate reflector 301 and/or the reflector 303 are, for example, curved reflectors. The first intermediate photonic layer 404 and the second intermediate photonic layer 505 include different slab effective indexes. For example, the first intermediate photonic layer 404 and the second intermediate photonic layer 505 include different materials with different dispersion. According to an alternative embodiment, the first intermediate photonic layer 404 and the second intermediate photonic layer 505 include sub-wavelength patterns with varying fill factor.

Figure 4:
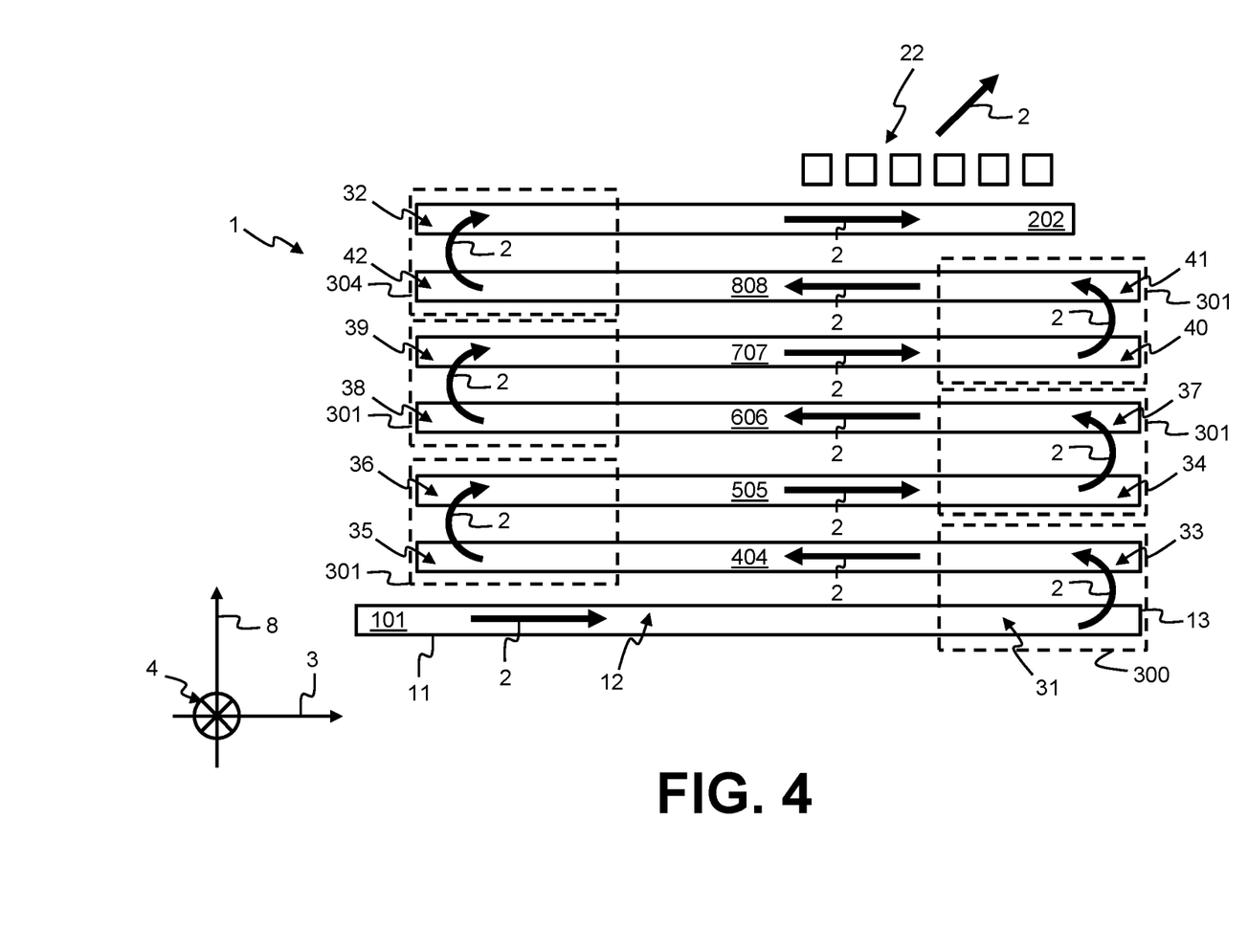
FIG. 4 depicts a cross-section view of a multilayer integrated photonic structure, wherein the multilayer integrated photonic structure includes seven photonic layers, according to example embodiments.

FIG. 4 schematically illustrates a cross-section view of an example embodiment of a multilayer integrated photonic structure 1 for optical beamforming according to the present disclosure. The multilayer integrated photonic structure 1 is, for example, manufactured on top of a substrate, not shown on the figures, but which extends along the longitudinal direction 3 shown on FIG. 1 and along the traverse direction 4 traverse to the longitudinal direction 3. A thickness of the substrate and of the layers extends along the depth direction 8 which is traverse to the longitudinal direction 3 and to the traverse direction 4. Components having reference numbers identical to the reference numbers of components of FIG. 1 or FIG. 2 or FIG. 3 fulfill the same function. The multilayer integrated photonic structure 1 includes a first photonic layer 101, a first intermediate photonic layer 404, a second intermediate photonic layer 505, a third intermediate photonic layer 606, a fourth intermediate photonic layer 707, a fifth intermediate photonic layer 808 and a second photonic layer 202. The layers are arranged on top of each other along the depth direction 8. The first photonic layer 101 includes a propagation region 11. The propagation region 11 includes a plurality of waveguides 12 and a slab region 13 in which the plurality of waveguides 12 terminates, i.e., to which the plurality of waveguides 12 optically couple. The second photonic layer 202 includes an outcoupling structure 22. The outcoupling structure 22 couples light 2 into and out of the multilayer integrated photonic structure 1, for example, out of as depicted on FIG. 3. The intermediate photonic layer 404 is formed between the first photonic layer 101 and the second intermediate photonic layer 505. The intermediate photonic layer 404 includes a first intermediate reflector element 33 in optical communication with the first reflector element 31 from the first photonic layer 101. Light 2 may couple from the first intermediate reflector element 33 to the first reflector element 31. Light may couple from the first reflector element 31 to the first intermediate reflector element 33. The first intermediate reflector element 33 optically couples the first intermediate photonic layer 404 with the slab region 13 of the first photonic layer 101. The intermediate photonic layer 404 includes a second intermediate reflector element 35. The second intermediate photonic layer 505 includes a first intermediate reflector element 36 in optical communication with the second intermediate reflector element 35 from the first intermediate photonic layer 404. Light 2 may couple from the first intermediate reflector element 36 of the second intermediate photonic layer 505 to the second intermediate reflector element 35 of the intermediate photonic layer 404. Light may couple from the second intermediate reflector element 35 of the intermediate photonic layer 404 to the first intermediate reflector element 36 of the second intermediate photonic layer 505. The first reflector element 31 and the first intermediate reflector element 33 extend continuously at the junction between the first photonic layer 101 and the first intermediate photonic layer 404. The first intermediate photonic layer 404 and the second intermediate photonic layer 505 are connected by an intermediate reflector 301 including the second intermediate reflector element 35 of the intermediate photonic layer 404 and the first intermediate reflector element 36 of the second intermediate photonic layer 505. The second intermediate reflector element 35 of the intermediate photonic layer 404 and the first intermediate reflector element 36 of the second intermediate photonic layer 505 extend continuously at the junction between the first intermediate photonic layer 404 and the second intermediate photonic layer 505. The second intermediate photonic layer 505 further includes a second intermediate reflector element 34 in optical communication with a first intermediate reflector element 37 of the third intermediate photonic layer 606. Light 2 may couple from the second intermediate reflector element 34 of the second intermediate photonic layer 505 to the first intermediate reflector element 37 of the third intermediate photonic layer 606. Light may couple from the first intermediate reflector element 37 of the third intermediate photonic layer 606 to the second intermediate reflector element 34 of the second intermediate photonic layer 505. The second intermediate photonic layer 505 and the third intermediate photonic layer 606 are connected by an intermediate reflector 301 including the second intermediate reflector element 34 of the second intermediate photonic layer 505 and the first intermediate reflector element 37 of the third intermediate photonic layer 606. The second intermediate reflector element 34 of the second intermediate photonic layer 505 and the first intermediate reflector element 37 of the third intermediate photonic layer 606 extend continuously at the junction between the second intermediate photonic layer 505 and the third intermediate photonic layer 606. The third intermediate photonic layer 606 further includes a second intermediate reflector element 38 in optical communication with a first intermediate reflector element 39 of the fourth intermediate photonic layer 707. Light 2 may couple from the second intermediate reflector element 38 of the third intermediate photonic layer 606 to the first intermediate reflector element 39 of the fourth intermediate photonic layer 707. Light may couple from the first intermediate reflector element 39 of the fourth intermediate photonic layer 707 to the second intermediate reflector element 38 of the third intermediate photonic layer 606. The third intermediate photonic layer 606 and the fourth intermediate photonic layer 707 are connected by an intermediate reflector 301 including the second intermediate reflector element 38 of the third intermediate photonic layer 606 and first intermediate reflector element 39 of the fourth intermediate photonic layer 707. The second intermediate reflector element 38 of the third intermediate photonic layer 606 and the first intermediate reflector element 39 of the fourth intermediate photonic layer 707 extend continuously at the junction between the third intermediate photonic layer 606 and the fourth intermediate photonic layer 707. The fourth intermediate photonic layer 707 further includes a second intermediate reflector element 40 in optical communication with a first intermediate reflector element 41 of the fifth intermediate photonic layer 808. Light 2 may couple from the second intermediate reflector element 40 of the fourth intermediate photonic layer 707 to the first intermediate reflector element 41 of the fifth intermediate photonic layer 808. Light may couple from the first intermediate reflector element 41 of the fifth intermediate photonic layer 808 to the second intermediate reflector element 40 of the fourth intermediate photonic layer 707. The fourth intermediate photonic layer 707 and the fifth intermediate photonic layer 808 are connected by an intermediate reflector 301 including the second intermediate reflector element 40 of the fourth intermediate photonic layer 707 and first intermediate reflector element 41 of the fifth intermediate photonic layer 808. The second intermediate reflector element 40 of the fourth intermediate photonic layer 707 and the first intermediate reflector element 41 of the fifth intermediate photonic layer 808 extend continuously at the junction between the fourth intermediate photonic layer 707 and the fifth intermediate photonic layer 808. The fifth intermediate photonic layer 808 further includes a second intermediate reflector element 42 in optical communication with the second reflector element 32 of the second photonic layer 202. Light 2 may couple from the second intermediate reflector element 42 of the fifth intermediate photonic layer 808 to the second reflector element 32 of the second photonic layer 202. Light may couple from the second reflector element 32 of the second photonic layer 202 to the second intermediate reflector element 42 of the fifth intermediate photonic layer 808. The fifth intermediate photonic layer 808 and the second photonic layer 202 are connected by a reflector 304 including the second intermediate reflector element 42 of the fifth intermediate photonic layer 808 and the second reflector element 32 of the second photonic layer 202. The second intermediate reflector element 42 of the fifth intermediate photonic layer 808 and the second reflector element 32 of the second photonic layer 202 extend continuously at the junction between the fifth intermediate photonic layer 808 and the second photonic layer 202. The outcoupling photonic structure 22 is, for example, an optical fiber grating coupler. The reflector 300 and/or the intermediate reflector 301 and/or the reflector 304 are, for example, curved reflectors. The first intermediate photonic layer 404, the second intermediate photonic layer 505, the third intermediate photonic layer 606, the fourth intermediate photonic layer 707 and the fifth intermediate photonic layer 808 include different slab effective indexes. For example, the first intermediate photonic layer 404, the second intermediate photonic layer 505, the third intermediate photonic layer 606, the fourth intermediate photonic layer 707 and the fifth intermediate photonic layer 808 include different materials with different dispersion. According to an alternative embodiment, the first intermediate photonic layer 404, the second intermediate photonic layer 505, the third intermediate photonic layer 606, the fourth intermediate photonic layer 707 and the fifth intermediate photonic layer 808 include sub-wavelength patterns with varying fill factor.

Figure 5A:
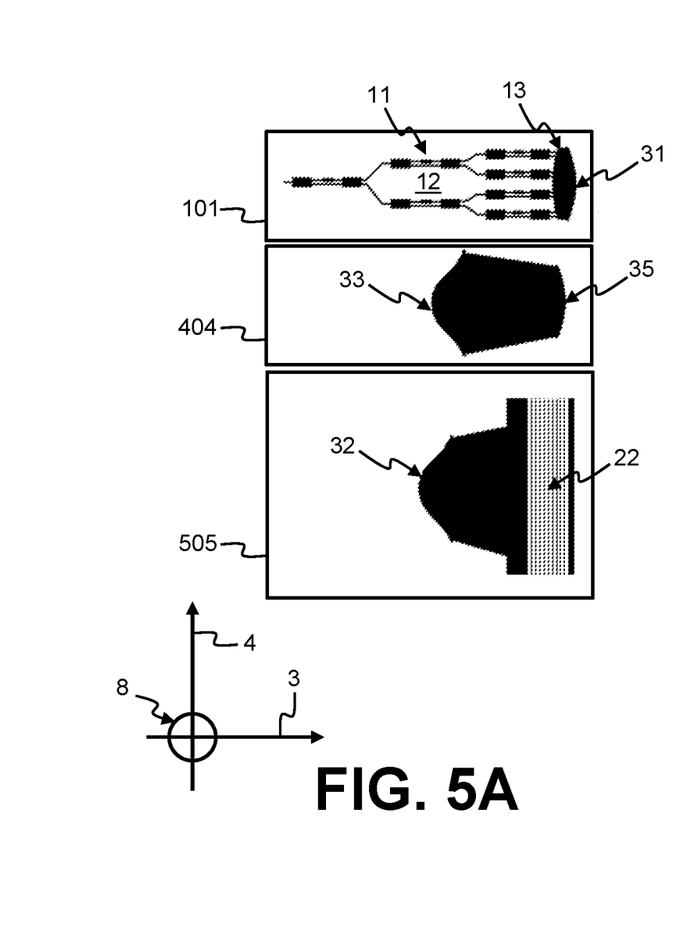
FIG. 5A schematically depicts a top view of different photonic layers of a multilayer integrated photonic structure, according to example embodiments.
Figure 5B:
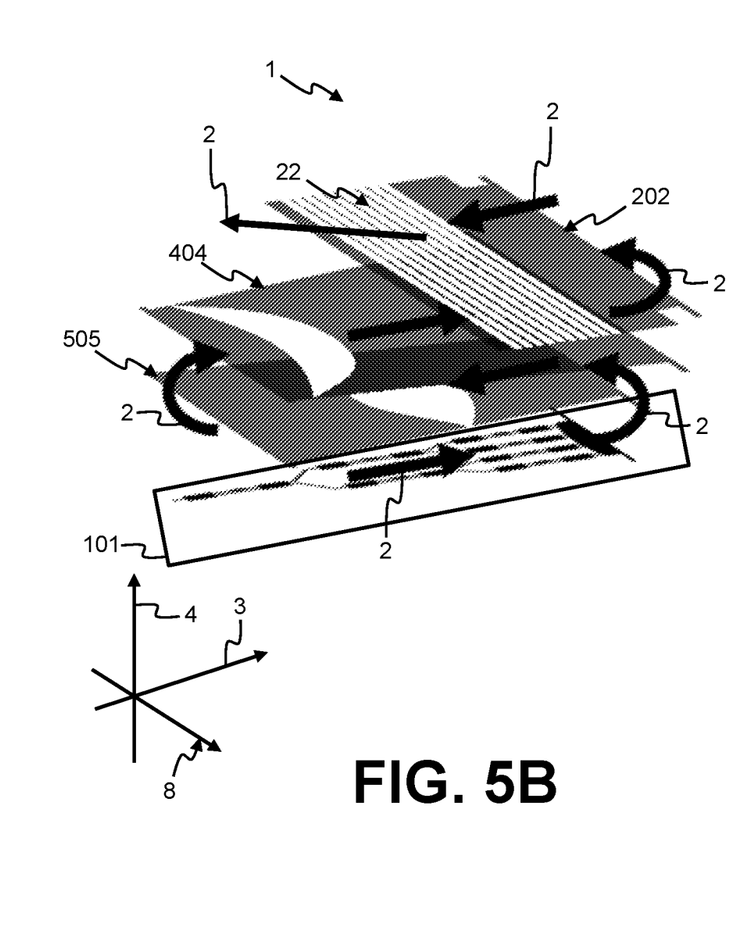
FIG. 5B schematically depicts a top view of different photonic layers arranged on top of each other of a multilayer integrated photonic structure, according to example embodiments.
Figure 5C:
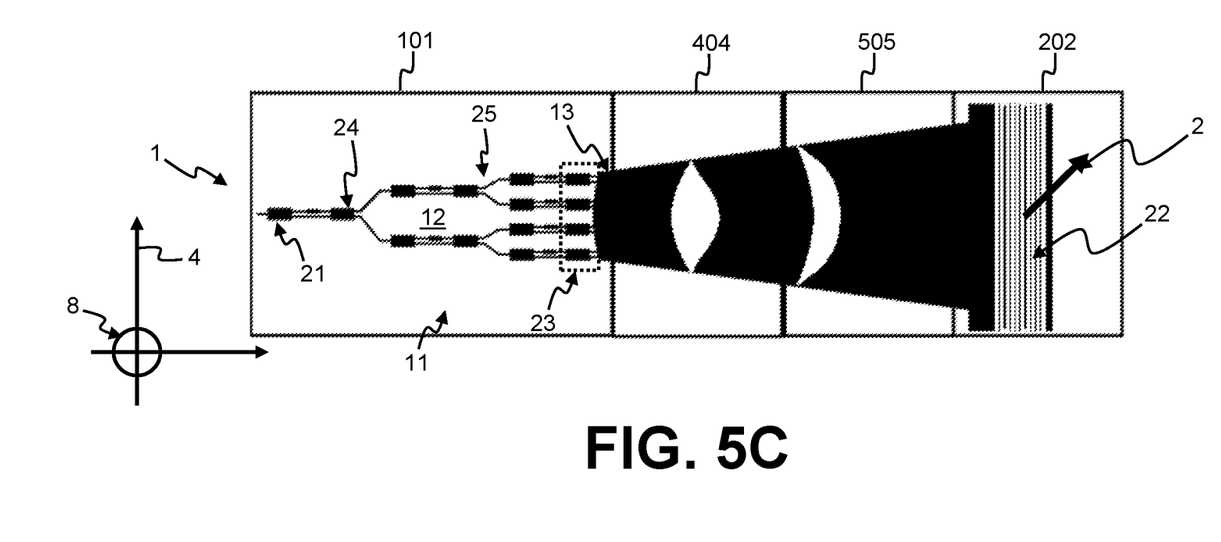
FIG. 5C schematically depicts a top view of different photonic layers of a multilayer integrated photonic structure, according to example embodiments.

FIG. 5A, FIG. 5B, and FIG. 5C schematically illustrate respectively an exploded view, a perspective view and a top view of an example embodiment of a multilayer integrated photonic structure 1 for optical beamforming according to the present disclosure. The multilayer integrated photonic structure 1 is, for example, manufactured on top of a substrate, not shown on the figures, but which extends along the longitudinal direction 3 shown on FIG. 1 and along the traverse direction 4 traverse to the longitudinal direction 3. A thickness of the substrate and of the layers extends along the depth direction 8 which is traverse to the longitudinal direction 3 and to the traverse direction 4. Components having reference numbers identical to the reference numbers of components of FIG. 1, FIG. 2, FIG. 3, or FIG. 4 fulfill the same function. The multilayer integrated photonic structure 1 includes a first photonic layer 101 and a second photonic layer 202. The layers are arranged on top of each other along the depth direction 8. The first photonic layer 101 includes a propagation region 11. The propagation region 11 includes a plurality of waveguides 12 and a slab region 13 in which the plurality of waveguides 12 terminates, i.e., to which the plurality of waveguides 12 optically couple. The propagation region 11, for example, includes an input port 21 configured to allow light to be coupled to and/or from the multilayer integrated photonic structure 1, a plurality of output ports 23 configured to optically couple the propagation region 11 and the slab region 13, a power divider section 24 and a splitter tree network 25. The second photonic layer 202 includes an outcoupling structure 22. The outcoupling structure 22 couples light 2 into and out of the multilayer integrated photonic structure 1, for example, out of as depicted on FIG. 1. The multilayer integrated photonic structure 1 further includes a reflector 300 configured to optically couple the slab region 13 of the first photonic layer 101 and the second photonic layer 202. The reflector 300 includes a first reflector element 31 included in the slab region 13 of the first photonic layer 101. The reflector 300 includes a second reflector element 32 included in the second photonic layer 202. The first reflector element 31 and the second reflector element 32 are in optical communication with each other. The first photonic layer 101 and the second photonic layer 202 are connected to each other at the reflector 300. The reflector 300 extends continuously at the junction between the first photonic layer 101 and the second photonic layer 202. The outcoupling photonic structure 22 is, for example, an optical fiber grating coupler. The reflector 300 is, for example, a curved reflector. The multilayer integrated photonic structure for optical beamforming is, for example, a Rotman lens. A typical Rotman lens includes an input section including one or more input ports configured to allow light to be coupled to and/or from the Rotman lens. A Rotman lens further includes a plurality of output ports optically coupling the propagating region and the slab region. A Rotman lens further includes a power divider section and a splitter network. Instead of folding the transmission lines of the Rotman lens, the length that would be required for the transmission lines is first determined. A reflector is then placed on each substantially halfway of the transmission line. The second part of the waveguide is placed on top of the first half of the waveguide in a second photonic layer formed on top of the first photonic layer including the first half of the waveguide. A continuous version of the Rotman lens would consist of making an actual lens-like design, made from one or several different photonic layers. Several lenses would be required to correct for aberrations.

Although example embodiments have been described, it will be apparent that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several elements recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments are capable of operating according to the present disclosure in other sequences, or in orientations different from the one(s) described or illustrated above.

What is claimed is:

1. A multilayer integrated photonic structure for optical beamforming, wherein the multilayer integrated photonic structure comprises:
   a propagation region formed in a first photonic layer, wherein the propagation region comprises a plurality of waveguides and a slab region in which the plurality of waveguides terminates;
   an outcoupling structure formed in a second photonic layer on top of the first photonic layer, wherein the outcoupling structure is configured to couple light into and out of the multilayer integrated photonic structure; and
   a reflector configured to optically couple the slab region of the first photonic layer and the second photonic layer,
   wherein the reflector comprises:
      a first reflector element comprised in the slab region of the first photonic layer; and
      a second reflector element comprised in the second photonic layer, and
   wherein the first reflector element and the second reflector element are in optical communication with each other.

2. The multilayer integrated photonic structure according to claim 1, wherein the first photonic layer and the second photonic layer are connected to each other at the reflector, and wherein the reflector extends continuously at a junction between the first photonic layer and the second photonic layer.

3. The multilayer integrated photonic structure according to claim 1, wherein the multilayer integrated photonic structure further comprises:
   one or more intermediate photonic layers formed between the first photonic layer and the second photonic layer;
   a first intermediate reflector element comprised in a first intermediate photonic layer and in optical communication with the first reflector element, wherein the first intermediate reflector element is configured to optically couple the first intermediate photonic layer with the slab region of the first photonic layer;
   a second intermediate reflector element comprised in a second intermediate photonic layer and in optical communication with the second reflector element, wherein the second intermediate reflector element is configured to optically couple the second intermediate photonic layer with the second photonic layer; and
   one or more intermediate reflectors configured to optically couple two of the intermediate photonic layers with each other.

4. The multilayer integrated photonic structure according to claim 3, wherein the intermediate photonic layers comprise different slab effective indexes.

5. The multilayer integrated photonic structure according to claim 4, wherein the intermediate photonic layers comprise different materials with different dispersion.

6. The multilayer integrated photonic structure according to claim 4, wherein the intermediate photonic layers comprise sub-wavelength patterns with varying fill factor.

7. The multilayer integrated photonic structure according to claim 6,
wherein the first photonic layer and the first intermediate photonic layer are connected by the first reflector element and the first intermediate reflector element, and
wherein the second intermediate photonic layer and the second photonic layer are connected by the second reflector element and the second intermediate reflector element.

8. The multilayer integrated photonic structure according to claim 7,
wherein the first reflector element and the first intermediate reflector element extend continuously at a junction between the first photonic layer and the first intermediate photonic layer, and
wherein the second reflector element and the second intermediate reflector element extend continuously at a junction between the second intermediate photonic layer and the second photonic layer.

9. The multilayer integrated photonic structure according to claim 8,
wherein each intermediate reflector comprises two intermediate reflector elements,
wherein each intermediate photonic layer comprises two intermediate reflector elements,
wherein one of the intermediate reflector element is formed in the intermediate photonic layer and is configured to optically couple the intermediate photonic layer with an intermediate photonic layer formed on top of the intermediate photonic layer along a direction extending from the first photonic layer to the second photonic layer, and
wherein the other intermediate reflector element is formed in the intermediate photonic layer and is configured to optically couple the intermediate photonic layer with an intermediate photonic layer formed below the intermediate photonic layer along the direction extending from the first photonic layer to the second photonic layer.

10. The multilayer integrated photonic structure according to claim 9, wherein the intermediate photonic layers are connected to each other via two of the intermediate reflector elements.

11. The multilayer integrated photonic structure according to claim 3, wherein the reflector or one or more of the intermediate reflectors are curved reflectors.

12. The multilayer integrated photonic structure according to claim 1, wherein the outcoupling structure is an optical fiber grating coupler.

13. The multilayer integrated photonic structure according to claim 1, wherein the propagation region comprises:
one or more input ports configured to allow light to be coupled to or from the multilayer integrated photonic structure;
a plurality of output ports configured to optically couple the propagation region and the slab region;
a power divider section; and
a splitter tree network.

14. The multilayer integrated photonic structure according to claim 1, wherein the slab region comprises a slab waveguide.

15. A method for manufacturing a multilayer integrated photonic structure for optical beamforming, wherein the method comprises:
forming a propagation region in a first photonic layer, wherein the propagation region comprises a plurality of waveguides and a slab region in which the plurality of waveguides terminates;
forming an outcoupling structure in a second photonic layer on top of the first photonic layer, wherein the outcoupling structure is configured to couple light into and out of the multilayer integrated photonic structure; and
forming a reflector configured to optically couple the slab region of the first photonic layer and the second photonic layer,
wherein the reflector comprises:
a first reflector element comprised in the slab region of the first photonic layer; and
a second reflector element comprised in the second photonic layer, and
wherein the first reflector element and the second reflector element are in optical communication with each other.

16. The method according to claim 15, further comprising:
forming one or more intermediate photonic layers between the first photonic layer and the second photonic layer;
forming a first intermediate reflector element comprised in a first intermediate photonic layer and in optical communication with the first reflector element, wherein the first intermediate reflector element is configured to optically couple the first intermediate photonic layer with the slab region of the first photonic layer;
forming a second intermediate reflector element comprised in a second intermediate photonic layer and in optical communication with the second reflector element, wherein the second intermediate reflector element is configured to optically couple the second intermediate photonic layer with the second photonic layer; and
forming one or more intermediate reflectors configured to optically couple two of the intermediate photonic layers with each other.

17. The method according to claim 16, wherein the intermediate photonic layers comprise different slab effective indexes.

18. The method according to claim 17, wherein the intermediate photonic layers comprise different materials with different dispersion.

19. The method according to claim 17, wherein the intermediate photonic layers comprise sub-wavelength patterns with varying fill factor.

20. The method according to claim 19,
wherein the first photonic layer and the first intermediate photonic layer are connected by the first reflector element and the first intermediate reflector element, and
wherein the second intermediate photonic layer and the second photonic layer are connected by the second reflector element and the second intermediate reflector element.

21. The method according to claim 15, wherein the first photonic layer and the second photonic layer are connected to each other at the reflector, and wherein the reflector extends continuously at a junction between the first photonic layer and the second photonic layer.

22. The method according to claim 15, wherein the slab region comprises a slab waveguide.

* * * * *